US008868019B2

(12) United States Patent
Yablonka et al.

(10) Patent No.: US 8,868,019 B2
(45) Date of Patent: Oct. 21, 2014

(54) FORWARD FILTER TRAINING SCHEME

(75) Inventors: Tomer Yablonka, Tel-Aviv (IL); Roy Oren, Magshimim (IL)

(73) Assignee: Siano Mobile Silicon Ltd., Kfar-Netter (IL)

( * ) Notice: Subject to any disclaimer, the term of this patent is extended or adjusted under 35 U.S.C. 154(b) by 623 days.

(21) Appl. No.: 13/187,525

(22) Filed: Jul. 21, 2011

(65) Prior Publication Data

US 2013/0023222 A1    Jan. 24, 2013

(51) Int. Cl.
*H04B 1/00* (2006.01)
*H04L 25/03* (2006.01)

(52) U.S. Cl.
CPC . *H04L 25/03057* (2013.01); *H04L 2025/03681* (2013.01); *H04L 2025/03503* (2013.01); *H04L 2025/03636* (2013.01)
USPC ............ 455/306; 455/307; 455/339; 455/340

(58) Field of Classification Search
CPC ...................................................... H04B 1/123
USPC ........................... 455/486, 306, 307, 339, 340
See application file for complete search history.

(56) References Cited

U.S. PATENT DOCUMENTS

| | | | | |
|---|---|---|---|---|
| 6,418,164 | B1 * | 7/2002 | Endres et al. | 375/232 |
| 7,324,616 | B2 * | 1/2008 | Sobchak et al. | 375/346 |
| 7,349,667 | B2 * | 3/2008 | Magee et al. | 455/63.4 |
| 7,792,221 | B2 | 9/2010 | Lin | |
| 8,290,024 | B2 * | 10/2012 | Sampath et al. | 375/148 |
| 2006/0146926 | A1 * | 7/2006 | Bhoja et al. | 375/233 |
| 2009/0296803 | A1 * | 12/2009 | Wang et al. | 375/233 |
| 2012/0063553 | A1 | 3/2012 | Carwana et al. | |

OTHER PUBLICATIONS

Mayyas et al., "Leaky LMS Algorithm: MSE Analysis for Guassian Data," IEEE Transactions on Signal Processing, vol. 45, No. 4, pp. 927-934, Apr. 1997.
Raphaeli et al., "Linear Equalizers for Turbo Equalization—A New Optimization Criterion for Determining the Equalizer Taps," 2nd International Symposium on Turbo Codes and Related Topics, pp. 371-374, Brest, France, Sep. 4-7, 2000.
Tuchler et al., "Minimum Mean Squared Error Equalization Using A-Priori Information," IEEE Transactions on Signal Processing, vol. 50, No. 3, pp. 673-683, Mar. 2002.
Lee et al., "Switching LMS Linear Turbo Equalization," Proceedings of the 2004 IEEE International Conference on Acoustics, Speech and Signal Processing (ICASSP 2004), vol. 4, pp. IV641-1V644, Montreal, Canada, May 17-21, 2004.
Choi et al., "Adaptive Linear Turbo Equalization Over Doubly Selective Channels," IEEE Journal of Oceanic Engineering, vol. PP, issue 99, Aug. 12, 2011.
U.S. Appl. No. 13/397,732 Office Action dated Feb. 5, 2014.

\* cited by examiner

*Primary Examiner* — Wen Huang
(74) *Attorney, Agent, or Firm* — D. Kligler I.P. Services Ltd

(57) ABSTRACT

A method includes receiving an input signal carrying transmitted values by a receiver, which includes a decision device that produces estimates of the transmitted values. The input signal is filtered using a forward filter to produce a forward-filtered signal, and the estimates of the transmitted values are filtered using a backward filter to produce a backward-filtered signal. The decision device is applied to a composite signal produced from the forward-filtered and backward-filtered signals, so as to produce the estimates of the transmitted values. An accuracy of the estimates of the transmitted values is assessed, and coefficients of the forward filter are adapted depending on the assessed accuracy.

22 Claims, 3 Drawing Sheets

FORWARD FILTER TRAINING SCHEME

FIELD OF THE INVENTION

The present invention relates generally to communication systems, and particularly to methods and systems for filter adaptation in communication receivers.

BACKGROUND OF THE INVENTION

Adaptive filters are widely used for filtering signals in communication receivers. Adaptive filters are used, for example, to compensate for the response of the communication channel, to improve Signal to Noise Ratio (SNR) or to reduce Inter-Symbol Interference (ISI), to name a few examples. Various filter adaptation techniques are known in the art. Some adaptation techniques involve Least Mean Square (LMS) processes. For example, Mayyas and Aboulnasr analyze a family of LMS processes known as leaky LMS, in "Leaky LMS Algorithm: MSE Analysis for Gaussian Data," IEEE Transactions on Signal Processing, volume 45, no. 4, April 1997, pages 927-934, which is incorporated herein by reference.

Raphaeli and Saguy investigate an adaptive equalization technique referred to as Turbo equalization, in "Linear Equalizers for Turbo Equalization—A New Optimization Criterion for Determining the Equalizer Taps," $2^{nd}$ International Symposium on Turbo Codes and Related Topics, Brest, France, Sep. 4-7, 2000, pages 371-374, which is incorporated herein by reference. Tüchler and Singer analyze equalizer performance in the Turbo equalization application, in "Minimum Mean Squared Error Equalization using A-Priori Information," IEEE Transactions on Signal Processing, volume 50, no. 3, March, 2002, pages 673-683, which is incorporated herein by reference.

Lee et al. describe a specific class of Turbo equalization algorithms, in "Switching LMS Linear Turbo Equalization," Proceedings of the 2004 IEEE International Conference on Acoustics, Speech, and Signal Processing (ICASSP 2004), Montreal, Canada, which is incorporated herein by reference. Yet another Turbo equalization technique is described by Choi et al., in "Adaptive Linear Turbo Equalization over Doubly Selective Channels," IEEE Journal of Oceanic Engineering, 2011, which is incorporated herein by reference.

SUMMARY OF THE INVENTION

An embodiment of the present invention that is described herein provides a method including receiving an input signal carrying transmitted values by a receiver, which includes a decision device that produces estimates of the transmitted values. The input signal is filtered using a forward filter to produce a forward-filtered signal, and the estimates of the transmitted values are filtered using a backward filter to produce a backward-filtered signal. The decision device is applied to a composite signal produced from the forward-filtered and backward-filtered signals, so as to produce the estimates of the transmitted values. An accuracy of the estimates of the transmitted values is assessed, and coefficients of the forward filter are adapted depending on the assessed accuracy.

In an embodiment, assessing the accuracy includes computing a statistical measure of the accuracy of the estimates over multiple transmitted values, and adapting the coefficients includes adjusting the coefficients based on the computed statistical measure of the accuracy.

In some embodiments, adapting the coefficients includes generating a noise signal whose magnitude depends on the assessed accuracy of the estimates, injecting the noise signal to an input of the forward filter, and adapting the coefficients while the forward filter operates on the noise signal. Adapting the coefficients may include injecting the noise signal into a duplicate forward filter, adapting the coefficients of the duplicate forward filter responsively to the noise signal, and setting the coefficients of the forward filter to match the adapted coefficients of the duplicate forward filter. In a disclosed embodiment, generating the noise signal includes generating a digital Pseudo-Noise (PN) sequence.

In another embodiment, adapting the coefficients includes adjusting the coefficients in a leaky Least Mean Square (LMS) adaptation process having a leakage factor that is selected depending on the assessed accuracy of the estimates. In yet another embodiment, adapting the coefficients includes initially setting the coefficients irrespective of the estimates, and subsequently adapting the coefficients so as to cause the forward filter to match the response of a communication channel over which the input signal is received.

In still another embodiment, receiving the input signal includes storing a first plurality of samples of the input signal and a second plurality of the estimates of the transmitted values in a memory, and adapting the coefficients includes processing the stored first and second pluralities. In an example embodiment, processing the stored first and second pluralities includes applying a series of Least Mean Square (LMS) iterations to the stored first and second pluralities.

In an embodiment, assessing the accuracy and adapting the coefficients include applying a series of adaptation iterations, and adapting the coefficients in a given iteration assuming the accuracy of the estimates is improved relative to a previous iteration that precedes the given iteration in the series. In some embodiments, the forward filter includes an adaptive equalizer. In some embodiments, the transmitted values in the input signal are encoded with an Error Correction Code (ECC), and the decision device includes a decoder of the ECC.

There is additionally provided, in accordance with an embodiment of the present invention, apparatus including a decision device, a forward filter, a backward filter and circuitry. The decision device is configured to produce estimates of transmitted values carried by a received input signal. The forward filter is configured to filter the input signal to produce a forward-filtered signal. The backward filter is configured to filter the estimates of the transmitted values to produce a backward-filtered signal. The circuitry is configured to apply the decision device to a composite signal produced from the forward-filtered and backward-filtered signals so as to produce the estimates of the transmitted values, to assess an accuracy of the estimates of the transmitted values produced by the decision device, and to adapt coefficients of the forward filter depending on the assessed accuracy.

The present invention will be more fully understood from the following detailed description of the embodiments thereof, taken together with the drawings in which:

DETAILED DESCRIPTION OF EMBODIMENTS

Overview

Figure 1:
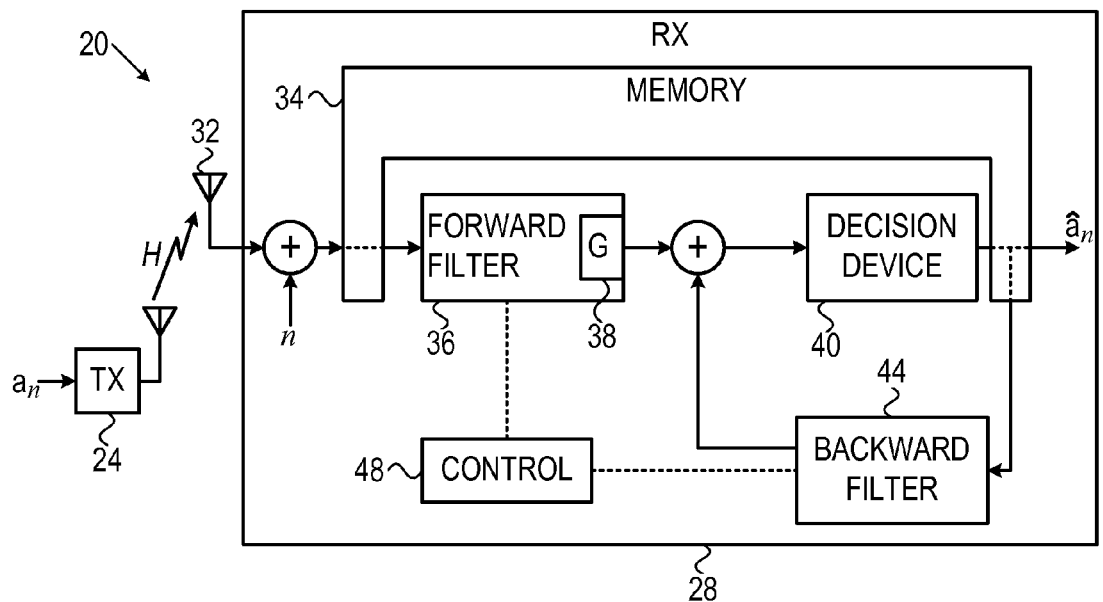
FIG. 1 is a block diagram that schematically illustrates a communication system, in accordance with an embodiment of the present invention.

Embodiments of the present invention that are described hereinbelow provide improved methods and systems for adaptive filtering in communication receivers. In the disclosed embodiments, a receiver includes a decision device, which produces estimates of transmitted values (e.g., bit or symbol values) carried by a received input signal. The receiver comprises a forward filter that filters the input signal, and a backward filter that filters the estimates of the transmitted values produced by the decision device. The decision device operates on a composite signal that is produced from the outputs of the forward and backward filters. Receiver configurations of this sort can be used, for example, for performing Turbo equalization.

In a typical embodiment, the receiver operates iteratively on a block of input signal samples that are stored in memory. In this embodiment, the receiver may use decisions of the decision device from previous iterations as input to the backward filter, and thus carry out non-causal filtering. For example, the receiver may cancel both pre-cursor Inter-Symbol Interference (ISI) caused by preceding symbols, and post-cursor ISI that is caused by subsequent symbols.

The methods and systems described herein adapt the response of the forward filter, e.g., by adjusting the filter coefficients, in order to optimize a certain performance criterion. In particular, the disclosed techniques adapt the forward filter depending on the accuracy of the estimates of the transmitted values that are produced by the decision device. Note that adapting the forward filter based on the accuracy of the decision device estimates is distinctly different from adapting the filter based on the estimates themselves. Typically, the receiver computes a statistical measure of the accuracy of the decision device estimates, over multiple transmitted values, and adapts the forward filter based on this statistical measure.

In an example embodiment, when the decision device produces highly unreliable estimates, the forward filter is adapted so as to approximately invert the response of the communication channel, and the output of the backward filter is given little or no weight. At the other extreme, when the decision device produces highly accurate estimates, the forward filter response is adapted so as to match the channel rather than invert it. In this case, the resulting Inter-Symbol Interference (ISI) is canceled using the backward filter. In a typical adaptation process, the forward filter is adapted gradually between these two extreme operating points.

The disclosed adaptation schemes are particularly useful in communication channels having significant ISI, although they can be used in various other channels, as well. Typically, the forward filter is adapted using a Least Mean Square (LMS) process that converges to the Minimum Mean Square Error (MMSE) solution, where the error is defined as the difference between the decision device input and output. The MMSE criterion may be applied in each of the extreme scenarios illustrated above, as well as in interim scenarios.

For example, when the decision device produces highly unreliable estimates, the forward filter is adapted so as to produce a signal meeting the MMSE criterion at its output, without assumption of any a-priori data. When the decision device produces highly reliable estimates, the MMSE criterion at the output of the forward filter is reached by using both the forward and backward filters, i.e., in the presence of reliable a-priori data.

Several example schemes for adapting the forward filter based on the accuracy of the decision device estimates are described herein. In one embodiment, the receiver generates a noise signal whose magnitude depends on the accuracy of the decision device estimates. The noise signal is injected to the forward filter, and the forward filter is adapted in the presence of this noise signal. In another embodiment, the forward filter is adapted in a leaky LMS process, whose leakage factor is scaled depending on the accuracy of the decision device estimates.

In an example embodiment, the forward filter comprises an adaptive equalizer, the decision device comprises an Error Correction Code (ECC) decoder, and the receiver uses the disclosed adaptation schemes to perform Turbo equalization. The adaptation schemes described herein may be applied iteratively to a pre-acquired block of input signal samples, until reaching the desired performance criterion.

Since the disclosed techniques adapt the forward filter based on the accuracy of the estimates produced by the decision device, the forward filter can be optimized to match diverse operating conditions. Although it is possible in principle to compute the optimal solution for the forward filter response without adaptation—using matrix inversion—this sort of computation is highly computationally intensive and unfeasible for many real-life channels and filters. The disclosed adaptation schemes, on the other hand, enable the receiver to optimize the forward filter using modest computational and memory resources, and therefore at modest cost, size and power consumption.

The disclosed schemes are also advantageous in sparse communication channels, in which case only few of the forward filter coefficients may be adapted and used for filtering. Moreover, the disclosed schemes are highly effective in adapting the forward filter in the presence of variable noise characteristics.

System Description

FIG. 1 is a block diagram that schematically illustrates a communication system 20, in accordance with an embodiment of the present invention. System 20 comprises a transmitter (TX) 24 that transmits signals over a wireless communication channel to a receiver 28. System 20 may operate in accordance with any suitable communication standard or protocol. In one embodiment, transmitter 24 transmits Mobile Digital Television (MDTV) signals, and receiver 28 is embodied in a mobile communication terminal that is configured to receive MDTV transmissions. The disclosed techniques, however, are in no way limited to MDTV applications.

Transmitter 24 transmits a Radio Frequency (RF) signal that carries transmitted values (e.g., bit or symbol values) denoted $a_n$. The RF signal is transmitted over a wireless channel whose response is denoted H. Receiver 28 comprises an antenna 32 for receiving the signal (referred to as input signal) from transmitter 24. A noise component denoted n, e.g., Additive White Gaussian Noise (AWGN), is modeled as being added to the signal at the receiver input.

Although the embodiments described herein refer mainly to AWGN, the disclosed techniques can be used with noise having any other suitable characteristics. Receiver elements that are not mandatory for understanding of the disclosed techniques, such as down-conversion and digitization, have been omitted from the figure for the sake of clarity.

Following reception, a block of digital samples of the input signal is stored in a memory 34. Subsequent processing in the receiver is typically applied off-line to these stored samples. In the present example, receiver 28 comprises a forward filter 36, a decision device 40, a backward filter 44 and a control unit 48. Forward filter 36 and backward filter 44 typically comprise digital Finite Impulse Response (FIR) filters having configurable coefficients (taps) that are set by control unit 48. Alternatively, filters 36 and 44 may comprise any other suitable type of filter. By adjusting the filter coefficients, the control unit is able to adapt the responses of the forward and backward filters.

In some embodiments, forward filter 36 comprises a final gain stage 38 that applies a configurable gain denoted G to the forward filter output. This gain stage is used, for example, in order to match the forward filter output to the magnitude of the nominal symbol constellation used by the receiver. The gain of gain stage 38 is set by control unit 48.

Decision device 40 produces estimates of the transmitted values $a_n$ carried by the input signal. The estimates are denoted $â_n$. In one embodiment, transmitter 24 encodes the transmitted values with an Error Correction Code (ECC), and decision device 40 comprises a decoder of this ECC. In alternative embodiments, decision device 40 may comprise any other suitable type of decision device, such as a soft decoder or hard slicer. The estimates produced by the decision device are stored in memory 34 for subsequent processing.

Figure 6:
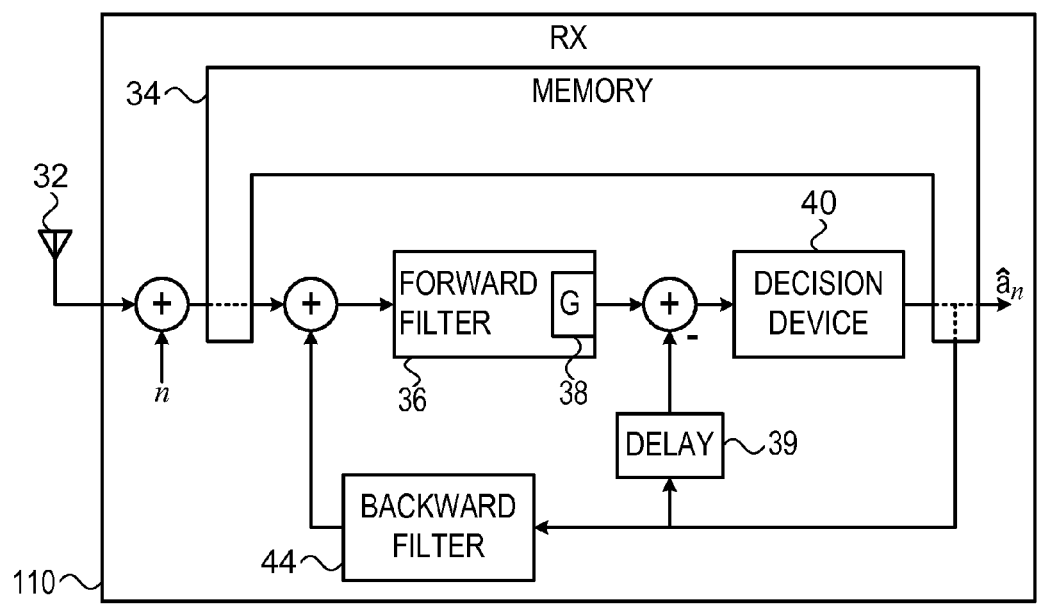
FIG. 6 is a block diagram that schematically illustrates a receiver, in accordance with an alternative embodiment of the present invention.

In the embodiment of FIG. 1, forward filter 36 filters the input signal samples stored in memory 34. Backward filter 44 filters the estimates $â_n$ that were produced by decision device 40 and stored in memory 34. The outputs of forward filter 36 and backward filter 44 are combined and provided as input to decision device 40. Note that this configuration is chosen purely by way of example, and that the disclosed techniques can be used with other suitable configurations of the forward filter, backward filter and decision device. Another example configuration is shown in FIG. 6 below.

In the embodiments described herein, filtering by the backward filter is non-causal. In other words, the backward filter is fed with one or more estimates $â_n$ that precede the time of the current filter output. In one example embodiment, in order to produce $â_n$, the backward filter uses samples from time $n-N/2+\Delta$ to $n+N/2-\Delta$, wherein N denotes the backward filter length and $\Delta$ denotes an arbitrary (positive or negative) delay. This non-causal operation is implementing by storing the decision device estimates in memory 34, and feeding the backward filter with decision device estimates from a previous iteration.

In some embodiments, control unit 48 adapts the coefficients of forward filter 36 and backward filter 44 in order to meet a certain performance criterion. Example criteria are MMSE, as explained above, maximum Signal to Noise Ratio (SNR), minimum Bit Error Rate (BER), Least Squares (LS) or any other suitable criterion.

In an example embodiment, control unit 48 adapts the filter coefficients in a Least Mean Square (LMS) adaptation process. Thus, the forward filter response converges to the MMSE solution. In particular, the control unit assesses the accuracy of estimates $â_n$, i.e., the extent to which $â_n$ are indicative of the transmitted values $a_n$, and adapts the coefficients of forward filter 36 based on the assessed accuracy. Example adaptation schemes are described in detail further below.

As noted above, receiver 28 typically stores a block of input signal samples and a block of decision device estimates in memory 34, and applies the adaptation process iteratively to the stored samples and estimates. In other words, control unit 48 initializes the coefficients of filters 36 and 44 to certain initial values, applies the filters and decision device to the stored samples, evaluates the performance criterion, adapts the filter coefficients so as to better meet the criterion, re-applies the adapted filters and decision device to the stored samples, and so on.

The configuration of receiver 28 shown in FIG. 1 is an example configuration, which is chosen purely for the sake of conceptual clarity. In alternative embodiments, any other suitable receiver configuration can be used. The various receiver elements can be implemented using hardware, such as using one or more RF Integrated Circuits (RFIC), Application-Specific Integrated Circuits (ASIC) or Field-Programmable Gate Arrays (FPGA). Alternatively, certain receiver elements can be implemented in software, or using a combination of hardware and software elements.

Control unit 48 and any additional receiver elements that interconnect the forward filter, the backward filter and the decision device are referred to herein as circuitry that carries out the techniques described herein. The circuitry may comprise hardware elements, software elements, or both.

In some embodiments, control unit 48 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Forward Filter Adaptation Based on the Accuracy of Decision Device Outputs

As explained above, receiver 28 configures the forward and backward filters differently depending on the accuracy of the estimates of the transmitted values ($â_n$) produced by decision device 40. In some embodiments, control unit 48 computes a measure of the accuracy, e.g. the mean square difference between $a_n$ and $â_n$, and adapts the forward filter coefficients based on this measure.

Consider, for example, a scenario in which the decision device produces highly unreliable estimates. This scenario may occur, for example, when adaptation is initiated and the filter responses have not yet converged to well-performing values. In this scenario, backward filter 44 is limited in its ability to correct Inter-Symbol Interference (ISI), since its input in unreliable. The desired strategy in this case is to disregard the output of the backward filter (e.g., by setting its coefficients to zero) and configure the forward filter to approximately invert the communication channel response. This approach minimizes ISI at the output of the forward filter (which cannot be corrected by the backward filter), although it does not provide maximum Signal to Noise Ratio (SNR).

As another example, consider a scenario in which decision device 40 produces highly accurate and reliable estimates. This scenario would occur, for example, after several adaptation iterations. In this scenario, the backward filter can be counted on to effectively cancel ISI. Therefore, a desirable strategy would be to configure the forward filter to match the channel response rather than invert it. This approach would yield maximum SNR at the output of the forward filter, at the expense of some ISI. Since the input to the backward filter ($\hat{a}_n$) is accurate and reliable, the ISI can be corrected using the backward filter.

The two examples above illustrate two extreme operating points. In practice, the accuracy of $\hat{a}_n$ may be at one of these operating points, or at some interim point between them. In the disclosed techniques, control unit 48 configures the forward filter according to the actual accuracy of $\hat{a}_n$ at any given time.

The following description gives a formal explanation of the above considerations. Let $0 \leq \bar{v} \leq 1$ denote the accuracy of $\hat{a}_n$, as assessed by control unit 48. The assessed accuracy is given by:

$$\bar{v} = E\{|a_n - \hat{a}_n|^2\} \quad [1]$$

wherein $E\{\}$ denotes expectancy that is computed over multiple transmitted values. In other words, unit 48 computes a long-term statistical measure of the accuracy of $\hat{a}_n$, over multiple symbols, and adapts the forward filter coefficients based on this statistical measure. In alternative embodiments, unit 48 may use any other suitable kind of statistical measure.

Without loss of generality, the variance of $a_n$ is assumed to be unity, and therefore $0 \leq \bar{v} \leq 1$. The disclosed techniques, however, are in no way limited to this convention.

The response of forward filter 36 can be written as:

$$\frac{H^*}{\sigma_n^2 + |H|^2 \cdot \bar{v}} \quad [2]$$

wherein H denotes the channel response and $\sigma_n^2$ denotes the variance of the noise component n. This equation provides the MMSE solution for the forward filter response. When the estimates $\hat{a}_n$ are highly unreliable and inaccurate, $\bar{v} \approx 1$, and Equation [2] becomes an inverse of H. When the estimates $\hat{a}_n$ are reliable and accurate, $\bar{v} \approx 0$, in which case Equation [2] becomes $H^*$, i.e., a matched filter to H. In any interim scenario, it can be seen that Equation [2] is close to the inverse of H when $\sigma_n^2 << \bar{v}$.

Figure 2:
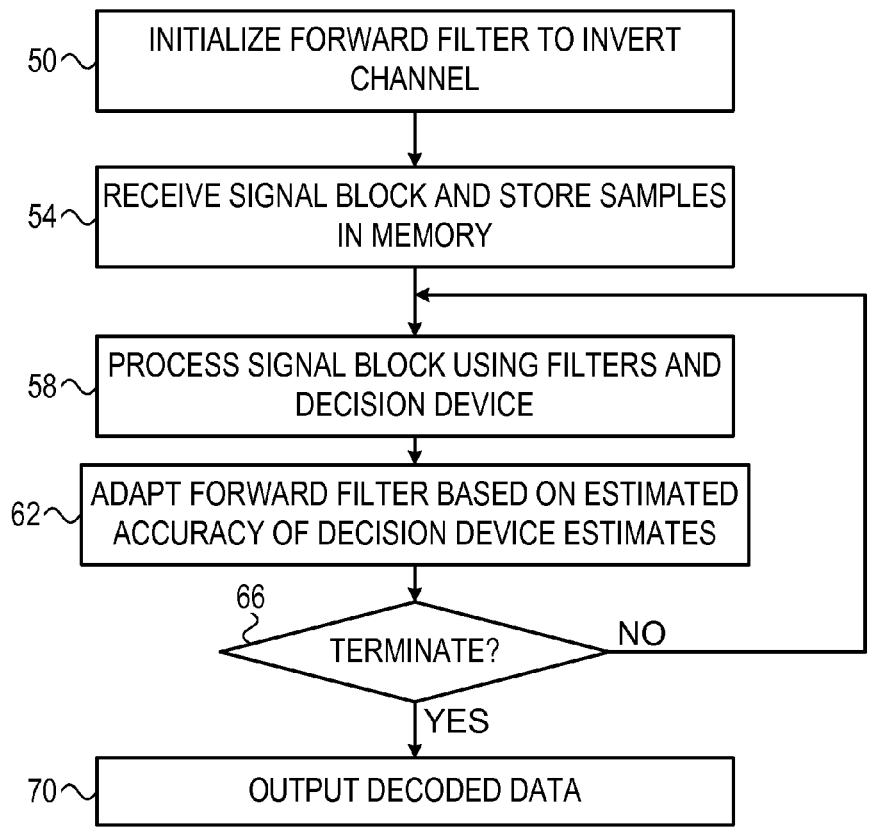
FIG. 2 is a flow chart that schematically illustrates a method for forward filter adaptation, in accordance with an embodiment of the present invention.

FIG. 2 is a flow chart that schematically illustrates a method for forward filter adaptation, in accordance with an embodiment of the present invention. The description that follows focuses on the adaptation of forward filter 36. Typically, backward filter 44 is also adapted, but this adaptation is not addressed herein and can be performed in any suitable way.

The method begins with control unit 48 initializing forward filter 36, at an initialization step 50. The initial values of the forward filter coefficients are typically selected such that the response of the forward filter is an inverse of the communication channel response. Receiver 28 receives the input signal, at a reception step 54. The receiver stores a block of input signal samples in memory for processing.

Control unit 48 now performs a reception processing iteration, at a processing step 58. In this iteration, the control unit processes the stored input signal samples using the forward filter, backward filter and decision device, in accordance with the scheme of FIG. 1. Following the processing iteration, control unit 48 adapts the coefficients of the forward filter, at an adaptation step 62. Typically, the control unit assesses the accuracy of estimates $\hat{a}_n$ and adapts the coefficients of the forward filter depending on the assessed accuracy. The control unit may assess the accuracy of $\hat{a}_n$ using Equation [1] above, or using any other suitable measure or method.

The control unit checks whether the iterative process should terminate, at a termination checking step 66. If the process should terminate, the receiver outputs the decoded data, at an output step 70, and the method terminates. Otherwise, the method loops back to step 58 above, in which the receiver processes the stored signal samples using the adapted filter.

Forward Filter Adaptation Using Noise Injection

Control unit 48 may use various techniques for adapting the coefficients of forward filter 36. In some embodiments, control unit 48 generates an artificial noise signal whose magnitude depends on the assessed accuracy of $\hat{a}_n$, injects this noise signal to the input of forward filter 36, and adapts the filter (e.g., using a LMS process that aims to minimize the mean square of the difference between the decision device input and output) while the filter operates on the artificial noise signal.

The response of forward filter 36 according to Equation [2] above can be rewritten as:

$$\frac{H^* \cdot \frac{1}{\bar{v}}}{\sigma_n^2 / \bar{v} + |H|^2} \quad [3]$$

Since $0 \leq \bar{v} \leq 1$, the term $\sigma_n^2/\bar{v}$ in Equation [3] represents a noise variance that is larger than $\sigma_n^2$. Therefore, forward filter 36 can be adapted to reach this response by training the filter using a noise signal whose variance is $\sigma_n^2/\bar{v}$. This noise variance is larger than $\sigma_n^2$, the noise variance of the actual receiver noise n.

The gain term $1/\bar{v}$ in the numerator of Equation [3] is typically compensated for by an existing receiver mechanism, e.g., a gain control mechanism that scales the received signal in order to fit the receiver's nominal symbol constellation. In the example of FIG. 1, this gain is set by configuring gain stage 38. In some embodiments, this sort of gain setting provides a minimum BER (as opposed to MMSE) solution.

In some embodiments, receiver 28 generates a noise signal whose variance is $\sigma_n^2[1/\bar{v}-1]$, injects this noise signal to the input of forward filter 36, and adapts the forward filter coefficients under these conditions. When added to the noise component n that is already present at the receiver input, the total noise variance at the receiver input becomes the desired $\sigma_n^2/\bar{v}$.

Note that the noise variance depends on $\bar{v}$, which represents the accuracy of the decision device estimates $\hat{a}_n$. When $\bar{v}$ is small (highly accurate estimates $\hat{a}_n$), the generated noise signal is strong, and vice versa. In a typical implementation, control unit 48 calculates $\bar{v}$ in accordance with Equation [1] above, measures $\sigma_n^2$ using any suitable noise estimation technique, and then generates a noise signal whose variance is $\sigma_n^2[1/\bar{v}-1]$.

Figure 3:
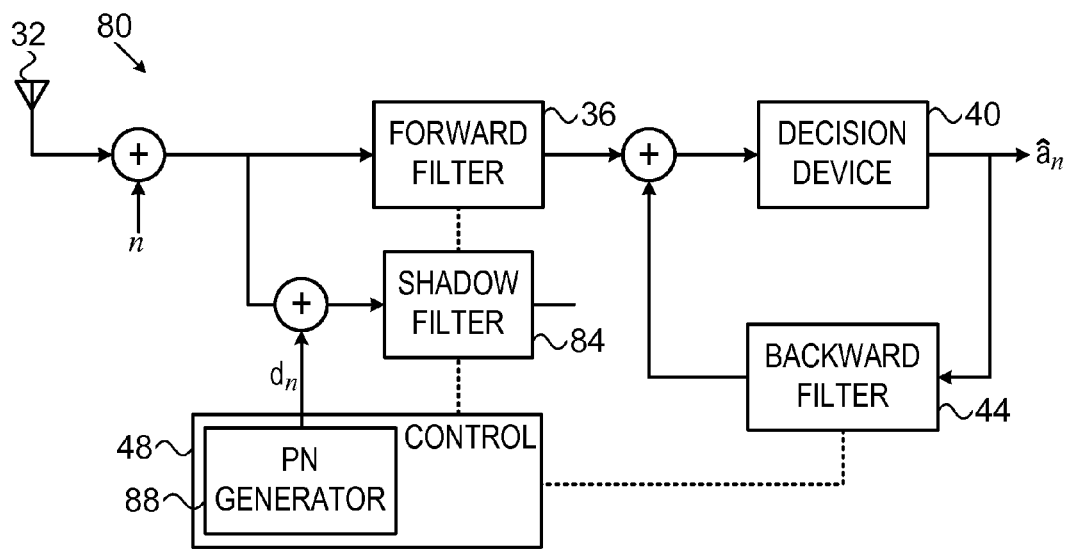
FIG. 3 is a block diagram that schematically illustrates a receiver, in accordance with an embodiment of the present invention.

FIG. 3 is a block diagram that schematically illustrates a receiver 80, which adapts the coefficients of forward filter 36 using noise injection, in accordance with an embodiment of the present invention. Certain receiver elements, such as memory 34 and gain stage 38, have been omitted from the figure for the sake of clarity.

Control unit 48 of receiver 80 comprises a Pseudo-Noise (PN) generator 88, which generates a digital PN sequence $d_n$ having a noise-like statistical distribution. Control unit 48 sets the variance of the PN sequence to be $\sigma_n^2[1/\bar{v}-1]$, injects the PN sequence to the input of the forward filter, and adapts the filter coefficients (e.g., using LMS) in the presence of the PN sequence.

In the embodiment of FIG. 3, receiver 80 comprises a shadow filter 84, also referred to as a duplicate forward filter. Filter 84 has a similar configuration to forward filter 36, and is used for coefficient adaptation while operating on the PN sequence. As can be seen in the figure, PN sequence $d_n$ is injected to the input of shadow filter 84 and not to the input of forward filter 36.

Using this technique, receiver 80 is able to adapt the forward filter coefficients without degrading the reception performance due to the higher noise level caused by the PN sequence. In a typical adaptation flow, control unit 48 copies the coefficients of filter 36 into filter 84, adapts the coefficients of filter 88 using the PN sequence, and, when adaptation is complete, copies the adapted coefficients from filter 84 to filter 36.

Figure 4:
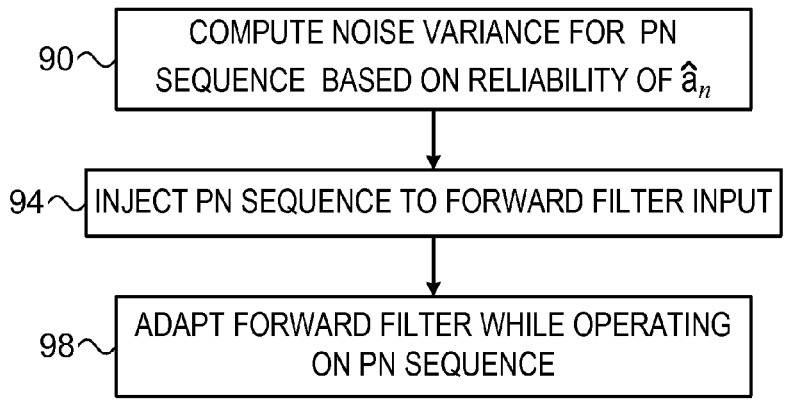
FIGS. 4 and 5 are flow charts that schematically illustrate methods for forward filter adaptation, in accordance with embodiments of the present invention.

FIG. 4 is a flow chart that schematically illustrates a method for forward filter adaptation, in accordance with an embodiment of the present invention. The method begins with control unit 48 computing the noise variance for the PN sequence $d_n$ based on the assessed accuracy of the decision device estimates $â_n$, at a variance computation step 90. After setting the appropriate noise variance, the control unit injects the PN sequence to the input of the shadow filter, at a sequence injection step 94. The control unit then adapts the coefficients of the shadow filter while the filter operates on the PN sequence, at a coefficient adaptation step 98.

Typically, as adaptation progresses and the accuracy of the decision device estimates improves, control unit 48 modifies the variance of the PN sequence in subsequent iterations to match the current accuracy.

Forward Filter Adaptation Using Leaky LMS

In alternative embodiments, receiver 28 of FIG. 1 above adapts the coefficients of forward filter 36 using a "leaky LMS" process. In such a process, the filter coefficient values in the $n^{th}$ adaptation iteration (not to be confused with receive block processing iteration) are given by:

$$\underline{C(n)} = \underline{C(n-1)} \cdot (1 - \mu \cdot \alpha) + \mu \cdot \epsilon(n) \cdot \underline{x} \quad [4]$$

wherein $\epsilon(n)$ denotes the difference between the decision device input and output, the vector $\underline{C(n)}$ denotes the set of forward filter coefficients in the $n^{th}$ iteration, $\underline{C(n-1)}$ denotes the set of forward filter coefficients in the previous iteration, $\underline{x}$ denotes the filter input, $\mu$ denotes an LMS convergence factor, and $\alpha$ denotes a leakage factor that reduces the contribution of $\underline{C(n-1)}$.

In this embodiment, control unit 48 selects and sets the leakage factor $\alpha$ depending on the assessed accuracy of the decision device estimates $â_n$. For example, the control unit may set the leakage factor to:

$$\alpha = \sigma_n^2 [1/\bar{v} - 1] \quad [5]$$

In this example the LMS leakage factor depends on $\bar{v}$, the assessed accuracy of $â_n$. In alternative embodiments, any other suitable setting of $\alpha$ that depends on the assessed accuracy of $â_n$ can be used. Note that this technique does not require a duplicate forward filter, since it does not introduce additional noise into the receiver.

Figure 5:
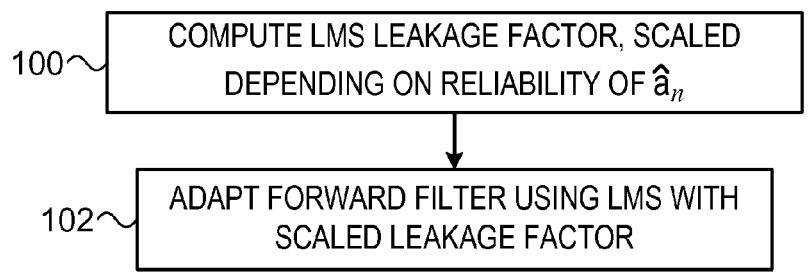

FIG. 5 is a flow chart that schematically illustrates a method for forward filter adaptation, in accordance with another embodiment of the present invention. The method begins with control unit 48 computing the LMS leakage factor $\alpha$ depending on the assessed accuracy of $â_n$, at a leakage computation step 100. The control unit then adapts forward filter 36 in a leaky LMS process using this leakage factor, at a leaky adaptation step 102.

Typically, as adaptation progresses and the accuracy of the decision device estimates improves, control unit 48 modifies the leakage factor in subsequent iterations to match the current accuracy.

In some embodiments, control unit 48 assumes that the accuracy of estimates $â_n$ improves from one LMS iteration to the next. In this embodiment, the control unit modifies the adaptation process under this assumption without necessarily measuring the accuracy in each iteration. For example, in the embodiment of FIGS. 3 and 4, the control unit may gradually increase the noise variance of the injected PN sequence from one LMS iteration to the next, e.g., by a constant step size. In the embodiment of FIG. 5, the control unit may gradually decrease the LMS leakage factor from one iteration to the next. Using these techniques, the forward filter coefficients are adapted based on the accuracy of $â_n$, without having to measure this accuracy explicitly.

Alternative Receiver Configurations

FIG. 6 is a block diagram that schematically illustrates a receiver 110, in accordance with an alternative embodiment of the present invention. As noted above, the disclosed techniques can be used with various configurations and interconnection schemes of the forward filter, backward filter and decision device. One such example is shown in FIG. 6. This example is different in configuration but equivalent mathematically to the configuration of FIG. 1 above.

In the present example, estimates of the transmitted values are provided as input to backward filter 44, as in FIG. 1. In FIG. 6, however, the output of the backward filter is added to the input signal before entering the forward filter. In addition, estimates of the transmitted values are delayed by a delay 39 and then subtracted from the output of the forward filter before entering the decision device. The scheme of FIG. 6 is typically able to use shorter backward filters than the scheme of FIG. 1. The forward filter is typically the same in both schemes.

Although the embodiments described herein mainly address training of forward filters in communication receivers, the methods and systems described herein can also be used in other applications. For example, the disclosed techniques can be used in various types of system that use equalization, such as in disks, memories, backplanes or fiber optics.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A method, comprising:
receiving an input signal carrying transmitted values by a receiver, which includes a decision device that produces estimates of the transmitted values;

filtering the input signal using a forward filter to produce a forward-filtered signal, and filtering the estimates of the transmitted values using a backward filter to produce a backward-filtered signal;

applying the decision device to a composite signal produced from the forward-filtered and backward-filtered signals, so as to produce the estimates of the transmitted values;

assessing an accuracy of the estimates of the transmitted values produced by the decision device; and adapting coefficients of the forward filter depending on the assessed accuracy, by generating a noise signal whose magnitude depends on the assessed accuracy of the estimates produced by the decision device, injecting the noise signal to an input of the forward filter, and adapting the coefficients while the forward filter operates on the noise signal.

2. The method according to claim 1, wherein assessing the accuracy comprises computing a statistical measure of the accuracy of the estimates over multiple transmitted values, and wherein adapting the coefficients comprises adjusting the coefficients based on the computed statistical measure of the accuracy.

3. The method according to claim 1, wherein adapting the coefficients comprises injecting the noise signal into a duplicate forward filter, adapting the coefficients of the duplicate forward filter responsively to the noise signal, and setting the coefficients of the forward filter to match the adapted coefficients of the duplicate forward filter.

4. The method according to claim 1, wherein generating the noise signal comprises generating a digital Pseudo-Noise (PN) sequence.

5. The method according to claim 1, wherein adapting the coefficients comprises adjusting the coefficients in a leaky Least Mean Square (LMS) adaptation process having a leakage factor that is selected depending on the assessed accuracy of the estimates.

6. The method according to claim 1, wherein adapting the coefficients comprises initially setting the coefficients irrespective of the estimates, and subsequently adapting the coefficients so as to cause the forward filter to match the response of a communication channel over which the input signal is received.

7. The method according to claim 1, wherein receiving the input signal comprises storing a first plurality of samples of the input signal and a second plurality of the estimates of the transmitted values in a memory, and wherein adapting the coefficients comprises processing the stored first and second pluralities.

8. The method according to claim 7, wherein processing the stored first and second pluralities comprises applying a series of Least Mean Square (LMS) iterations to the stored first and second pluralities.

9. The method according to claim 1, wherein assessing the accuracy and adapting the coefficients comprise applying a series of adaptation iterations, and adapting the coefficients in a given iteration assuming the accuracy of the estimates is improved relative to a previous iteration that precedes the given iteration in the series.

10. The method according to claim 1, wherein the forward filter comprises an adaptive equalizer.

11. The method according to claim 1, wherein the transmitted values in the input signal are encoded with an Error Correction Code (ECC), and wherein the decision device comprises a decoder of the ECC.

12. Apparatus, comprising:
a decision device, which is configured to produce estimates of transmitted values carried by a received input signal;
a forward filter, which is configured to filter the input signal to produce a forward-filtered signal;
a backward filter, which is configured to filter the estimates of the transmitted values to produce a backward-filtered signal; and
circuitry, which is configured to apply the decision device to a composite signal produced from the forward-filtered and backward-filtered signals so as to produce the estimates of the transmitted values, to assess an accuracy of the estimates of the transmitted values produced by the decision device, and to adapt coefficients of the forward filter depending on the assessed accuracy, by generating a noise signal whose magnitude depends on the assessed accuracy of the estimates produced by the decision device, injecting the noise signal to an input of the forward filter, and adapting the coefficients while the forward filter operates on the noise signal.

13. The apparatus according to claim 12, wherein the circuitry is configured to assess the accuracy by computing a statistical measure of the accuracy of the estimates over multiple transmitted values, and to adapt the coefficients based on the computed statistical measure of the accuracy.

14. The apparatus according to claim 12, and comprising a duplicate forward filter, wherein the circuitry is configured to inject the noise signal into the duplicate forward filter, to adapt the coefficients of the duplicate forward filter responsively to the noise signal, and to set the coefficients of the forward filter to match the adapted coefficients of the duplicate forward filter.

15. The apparatus according to claim 12, wherein the circuitry is configured to generate the noise signal by generating a digital Pseudo-Noise (PN) sequence.

16. The apparatus according to claim 12, wherein the circuitry is configured to adjust the coefficients in a leaky Least Mean Square (LMS) adaptation process having a leakage factor that is selected depending on the assessed accuracy of the estimates.

17. The apparatus according to claim 12, wherein the circuitry is configured to initially set the coefficients irrespective of the estimates, and to subsequently adapt the coefficients so as to cause the forward filter to match the response of a communication channel over which the input signal is received.

18. The apparatus according to claim 12, wherein the circuitry is configured to store a first plurality of samples of the input signal and a second plurality of the estimates of the transmitted values in a memory, and to adapt the coefficients by processing the stored first and second pluralities.

19. The apparatus according to claim 18, wherein the circuitry is configured to apply a series of Least Mean Square (LMS) iterations to the stored first and second pluralities.

20. The apparatus according to claim 12, wherein the circuitry is configured to apply a series of adaptation iterations, and to adapt the coefficients in a given iteration assuming the accuracy of the estimates is improved relative to a previous iteration that precedes the given iteration in the series.

21. The apparatus according to claim 12, wherein the forward filter comprises an adaptive equalizer.

22. The apparatus according to claim 12, wherein the transmitted values in the input signal are encoded with an Error Correction Code (ECC), and wherein the decision device comprises a decoder of the ECC.

* * * * *